US012322560B2

(12) United States Patent
Steger et al.

(10) Patent No.: US 12,322,560 B2
(45) Date of Patent: Jun. 3, 2025

(54) SLIDE SWITCH WITH ELASTOMER WEB

(71) Applicants: Stephen Andrew Steger, Los Angeles, CA (US); Jordan Wakser, Los Angeles, CA (US); Nicholas Streets, Los Angeles, CA (US)

(72) Inventors: Stephen Andrew Steger, Los Angeles, CA (US); Jordan Wakser, Los Angeles, CA (US); Nicholas Streets, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 17/829,967

(22) Filed: Jun. 1, 2022

(65) Prior Publication Data

US 2023/0395341 A1 Dec. 7, 2023

(51) Int. Cl.

*H01H 15/10* (2006.01)
*H01H 11/00* (2006.01)
*H01H 15/16* (2006.01)

(52) U.S. Cl.

CPC ............ *H01H 15/10* (2013.01); *H01H 11/00* (2013.01); *H01H 15/16* (2013.01)

(58) Field of Classification Search

CPC ........ H01H 15/10; H01H 11/00; H01H 15/16; H01H 3/02; H01H 3/32; H01H 2201/014; H01H 2227/034; H01H 15/005; H01H 2225/028; H01H 3/60; H01H 15/00; H01H 15/02; H01H 2221/062; G02B 27/01; G02C 5/22

USPC ......................... 200/329, 536, 541, 547–551

See application file for complete search history.

(56) References Cited

U.S. PATENT DOCUMENTS

| | | | | |
|---|---|---|---|---|
| 3,345,488 A * | 10/1967 | Siegal | .................... | H02B 1/044 200/519 |
| 8,362,377 B2 * | 1/2013 | Wei | ........................ | H01H 15/10 200/329 |
| 2001/0030116 A1 * | 10/2001 | Ohashi | .................. | H01H 15/06 200/302.1 |
| 2005/0058308 A1 | 3/2005 | Chang | | |
| 2010/0108483 A1 | 5/2010 | Zuo | | |

(Continued)

FOREIGN PATENT DOCUMENTS

| | | |
|---|---|---|
| CN | 114388292 A | 4/2022 |
| JP | H08138487 A | 5/1996 |

OTHER PUBLICATIONS

International Search Report and Written Opinion for International Application No. PCT/US2023/023590, dated Sep. 18, 2023 (Dec. 18, 2023)—10 pages.

*Primary Examiner* — Lheiren Mae A Caroc

(74) *Attorney, Agent, or Firm* — Stephen J. Weed; CM Law PLLC

(57) ABSTRACT

A slide switch with an elastomer web for eliminating slide backlash and rattle. The elastomer web is disposed in the motion path of a mechanical slider and biases the slider to contact a switch nub. The biased slider eliminates a loose translational motion of the mechanical slider and therefore a user's perception of loose motion or backlash when actuating the switch. The elastomer web improves the user's perception of the mechanical slider's quality. Additionally, the elastomer web allows for larger assembly tolerances between the mechanical slider and the switch nub. An increased assembly tolerance improves yield for mechanical parts and reduces the cost of manufacturing.

18 Claims, 8 Drawing Sheets

(56) References Cited

U.S. PATENT DOCUMENTS

| | | | | |
|---|---|---|---|---|
| 2012/0186959 | A1* | 7/2012 | Chen | H04M 1/236 200/329 |
| 2012/0241295 | A1* | 9/2012 | Huang | H01H 15/24 200/330 |
| 2020/0052254 | A1* | 2/2020 | Ohshima | G02C 11/10 |
| 2022/0128840 | A1 | 4/2022 | Peterson | |

* cited by examiner

SLIDE SWITCH WITH ELASTOMER WEB

TECHNICAL FIELD

The present subject matter relates to a slide switch.

BACKGROUND

Slide switches are used in a wide variety of electronic devices. The quality of assembly of the slide switch impacts a user's experience of the electronic device. The tolerance of manufactured parts for the slide switch also affects the cost of producing the slide switch.

BRIEF DESCRIPTION OF THE DRAWINGS

The drawing figures depict one or more implementations, by way of example only, not by way of limitations. In the figures, like reference numerals refer to the same or similar elements.

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

Figure 1:
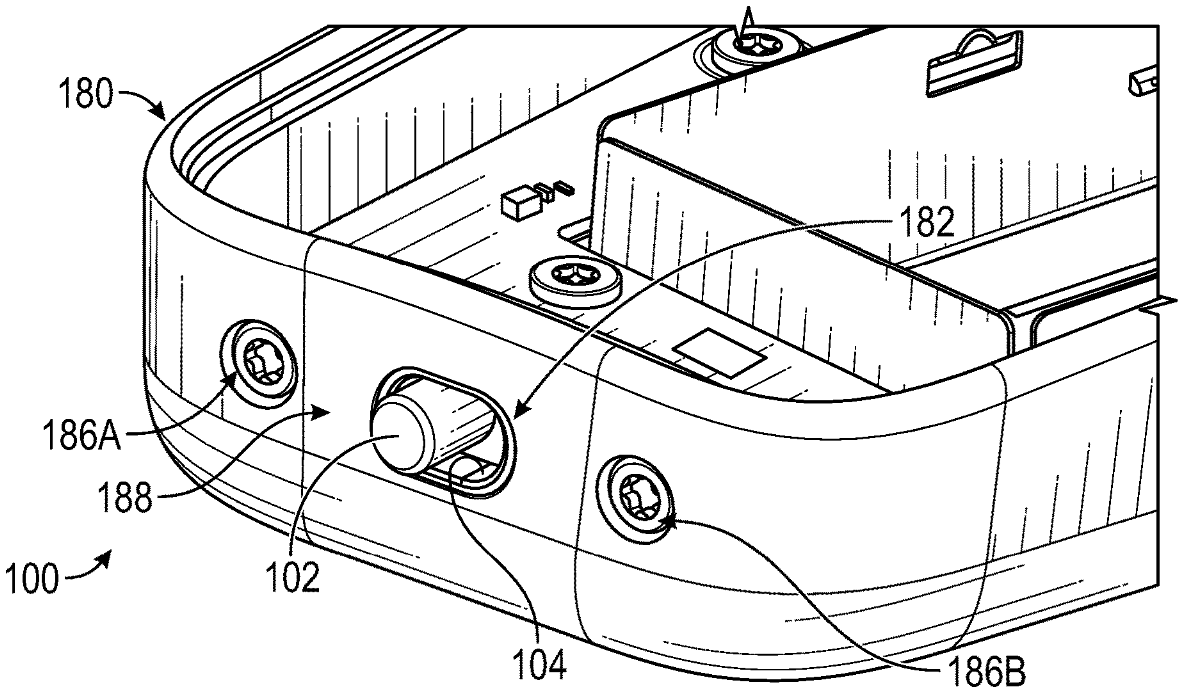
Figure 2:
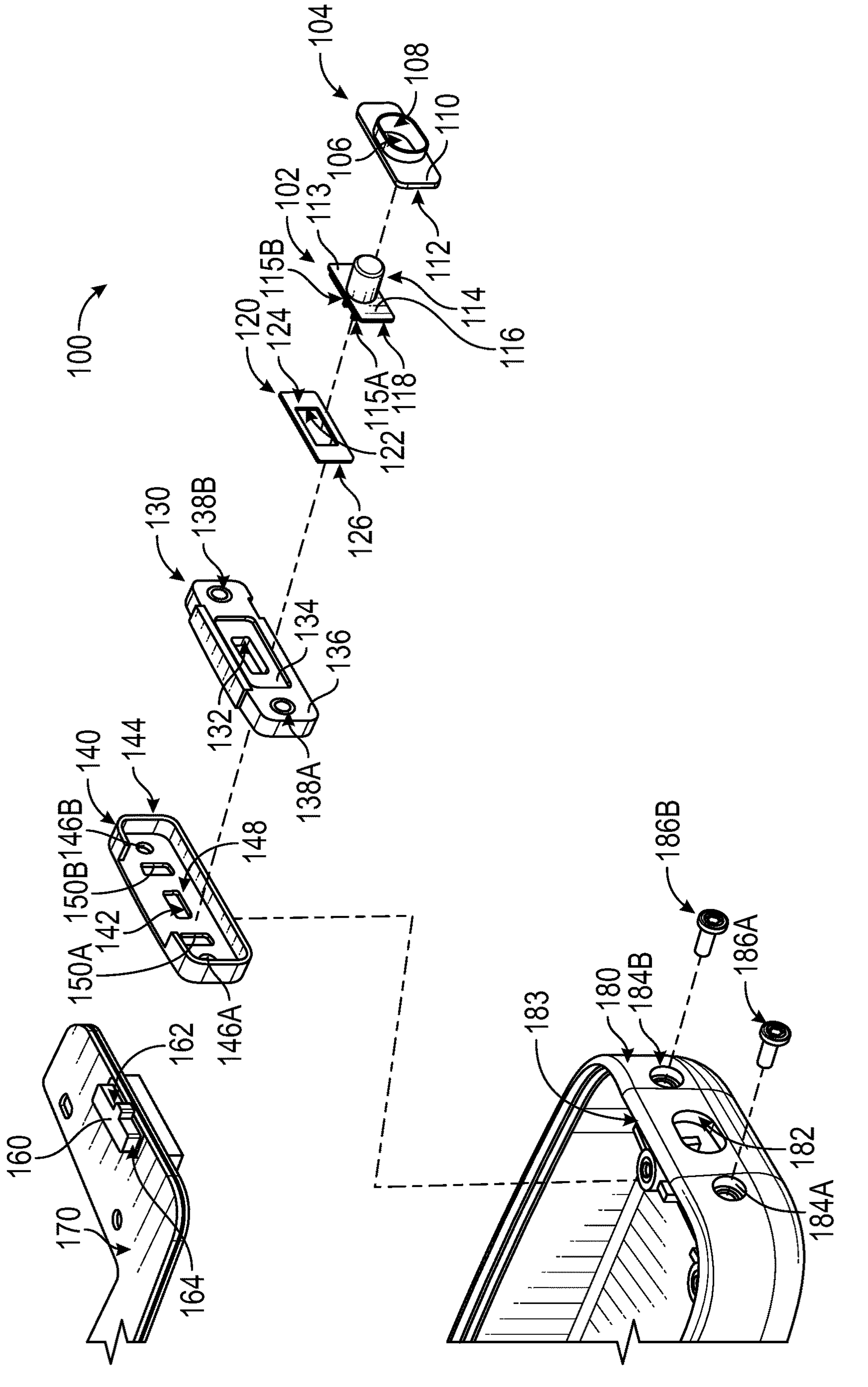
Figure 3A:
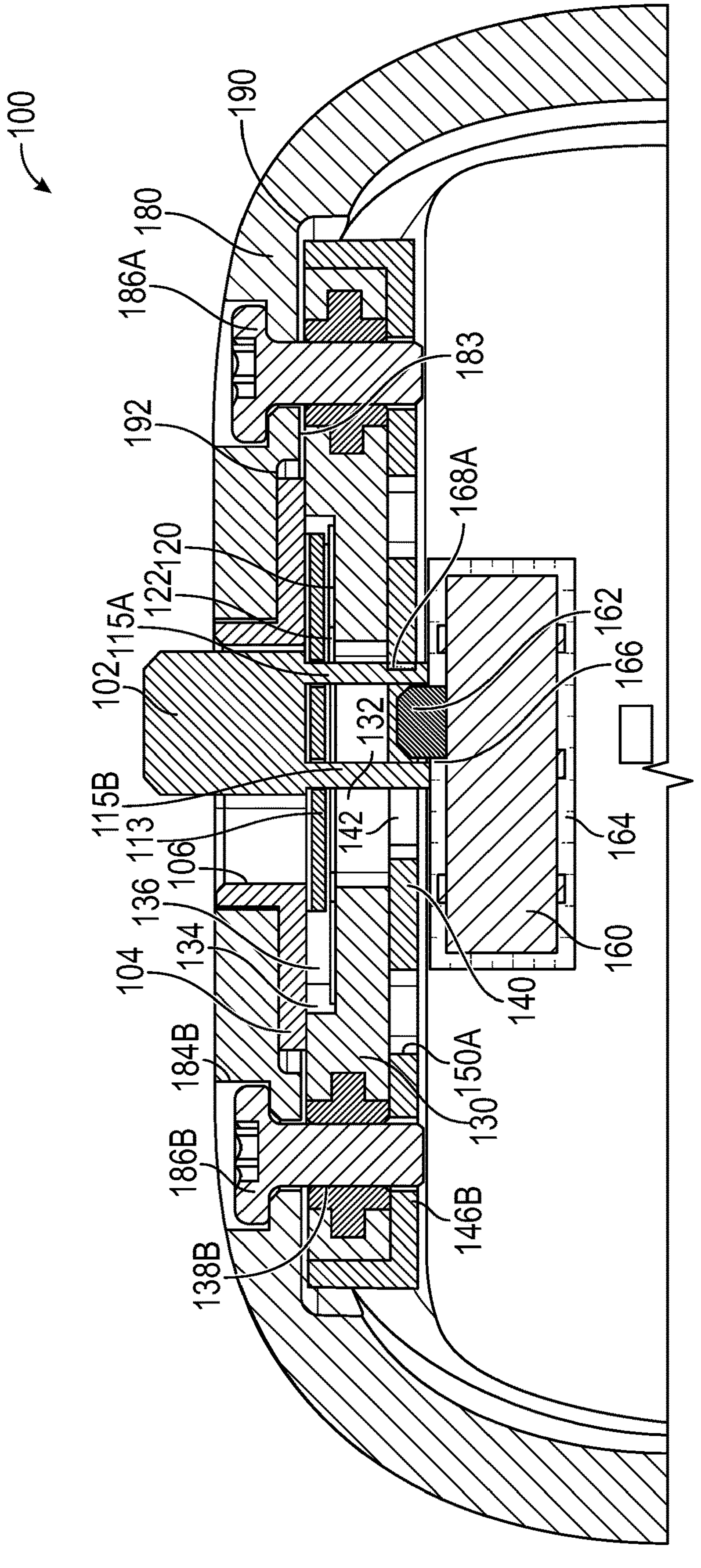
Figure 3B:
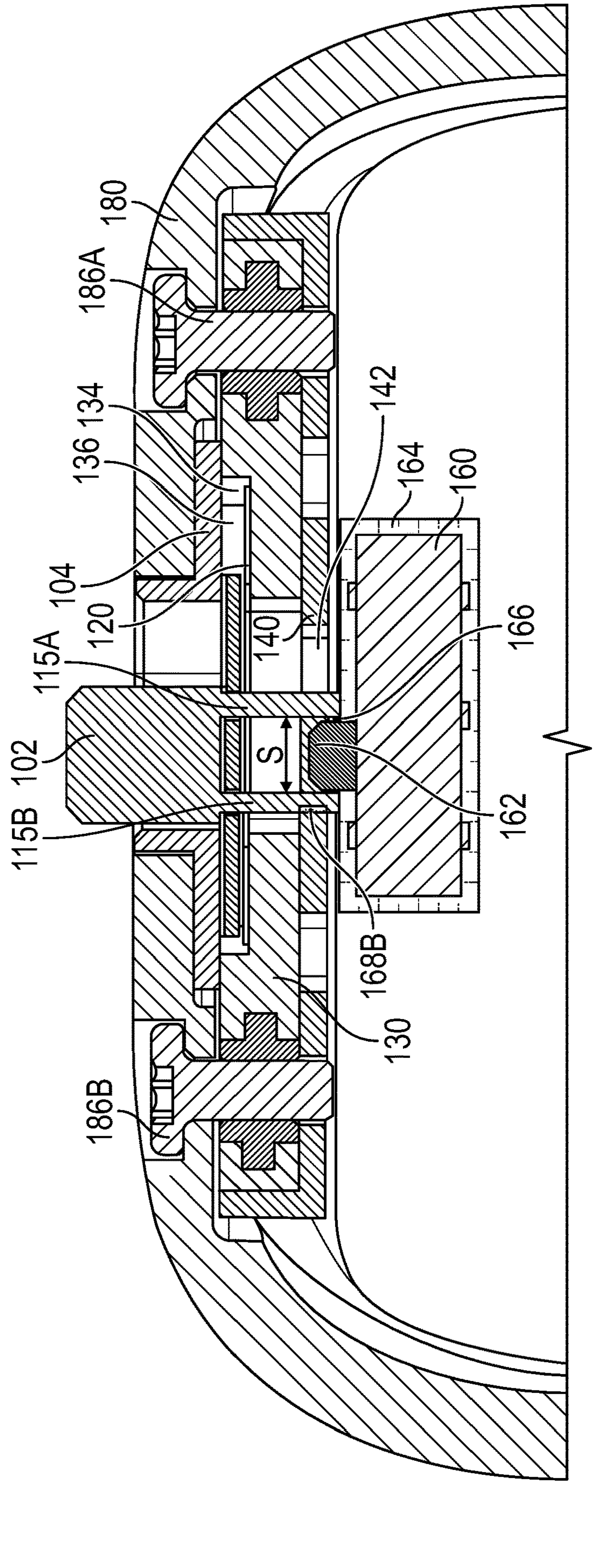
Figure 4:
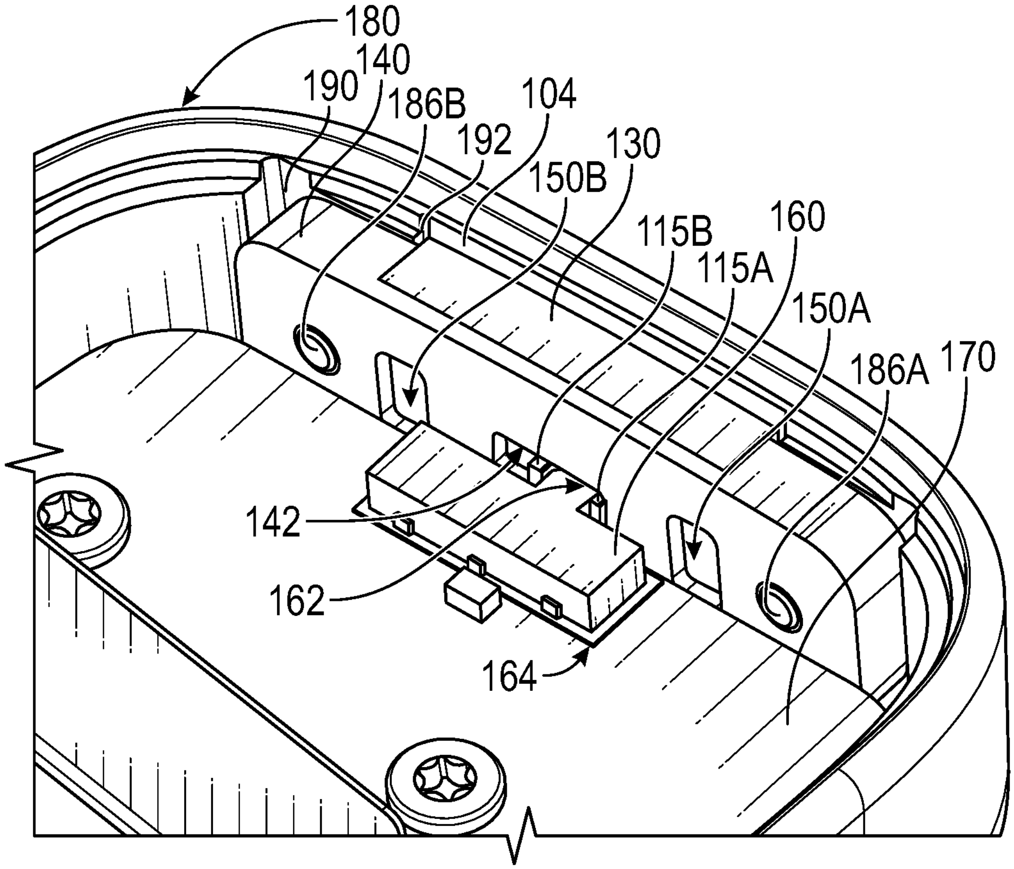
Figure 5A:
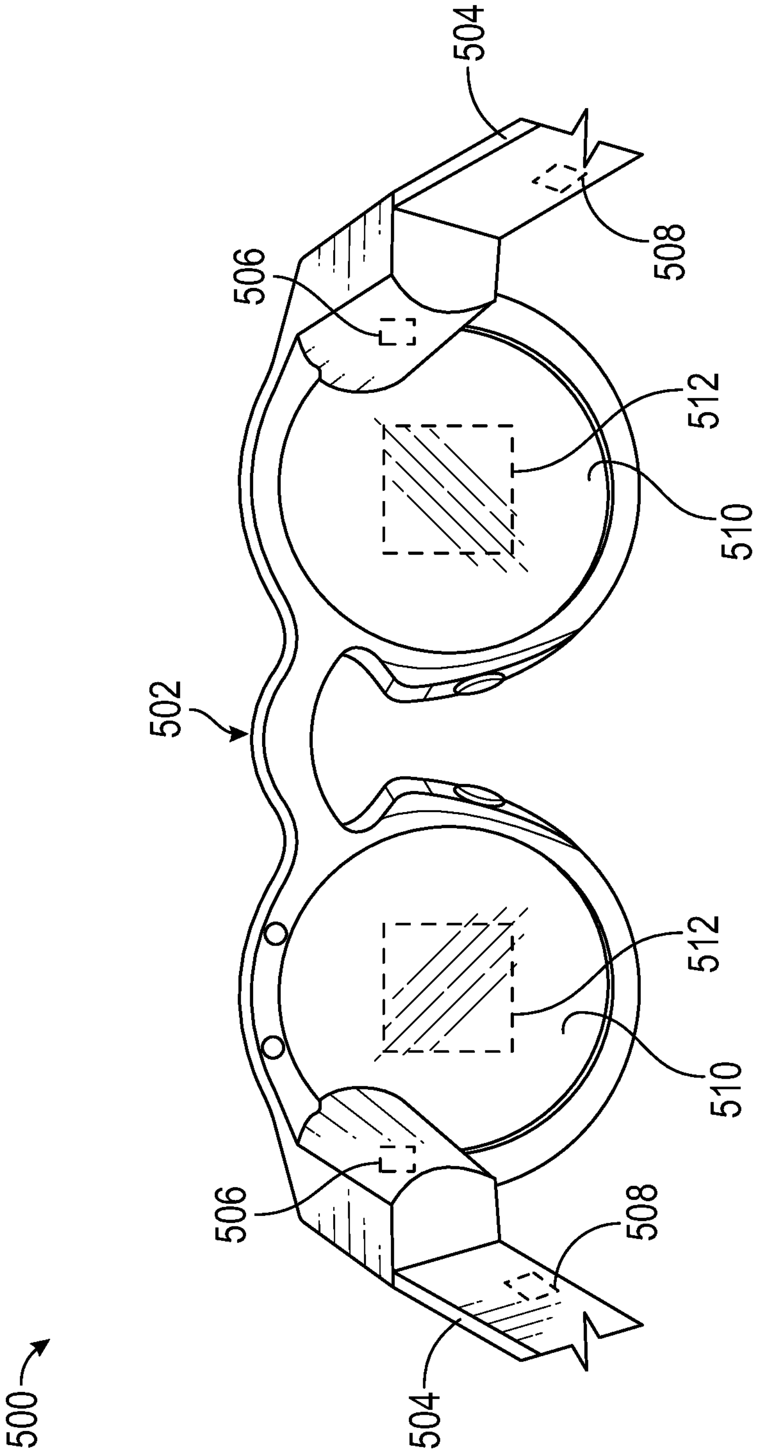
Figure 5B:
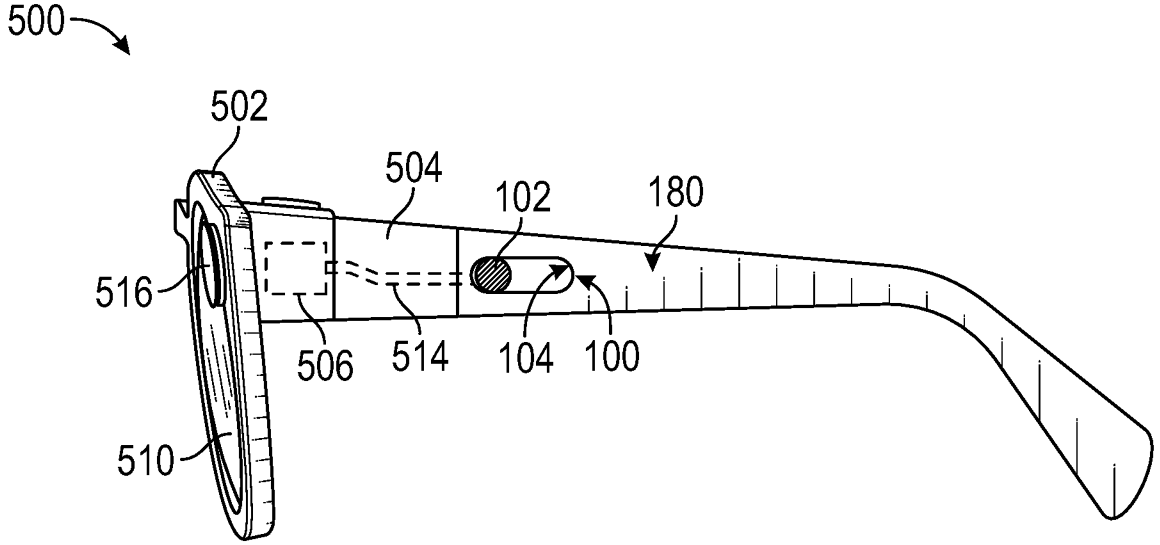
Figure 6:
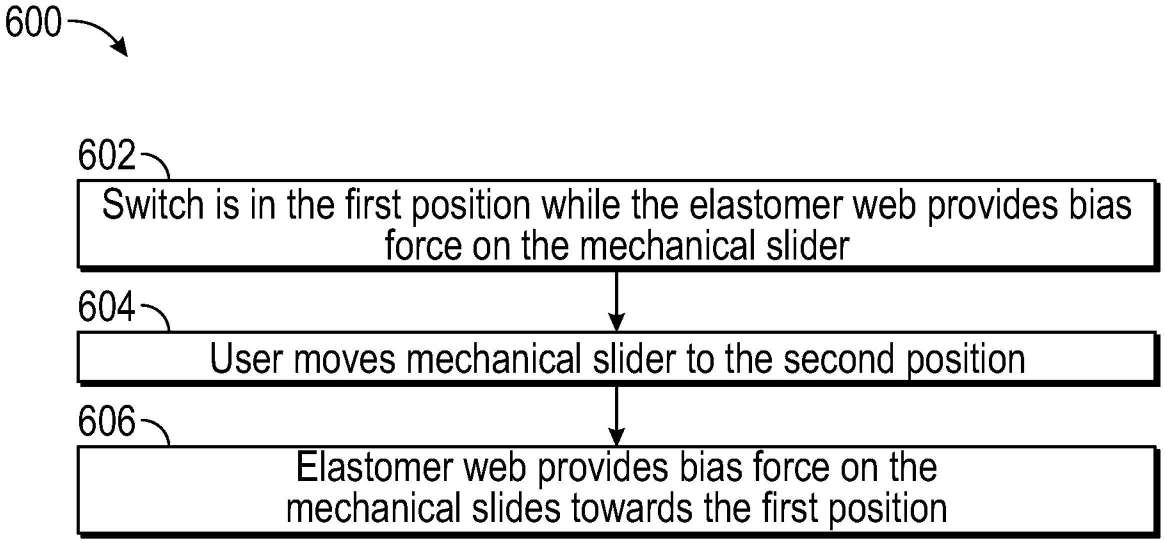

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 1 is a perspective view of a slide switch assembly and an enclosure;

FIG. 2 is an exploded view of the slide switch assembly illustrated FIG. 1;

FIG. 3A is a cross sectional view of the slide switch assembly illustrated in FIG. 1 in a first position;

FIG. 3B is a cross sectional view of the slide switch assembly illustrated in FIG. 1 in a second position;

FIG. 4 is a top perspective view of the slide switch assembly illustrated in FIG. 1;

FIG. 5A is a rear view of an electronic eyewear device where the temple includes the enclosure;

FIG. 5B is a side view of an electronic eyewear device where the temple includes the enclosure;

FIG. 6 is flow chart for a method of using the slide switch assembly; and

Figure 7:
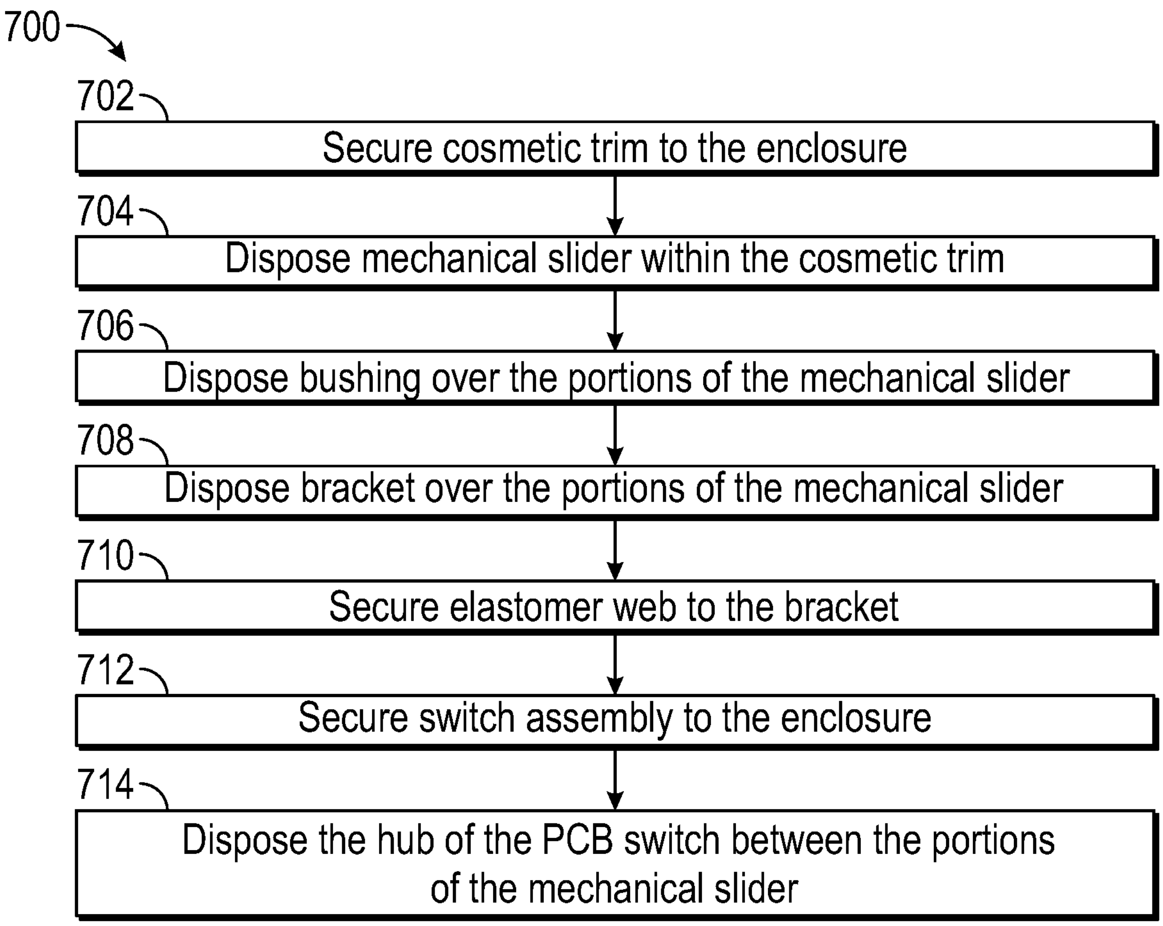

FIG. 7 is a flow chart for a method of manufacturing the slide switch assembly.

DETAILED DESCRIPTION

A slide switch with an elastomer web for eliminating slider backlash and rattle. The elastomer web is disposed in a motion path of a mechanical slider and biases the slider to contact a switch nub. The biased slider eliminates a loose translational motion of the mechanical slider and therefore a user's perception of loose motion or backlash when actuating the switch. The elastomer web improves the user's quality perception of the mechanical slider. Additionally, the elastomer web allows for larger assembly tolerances between the mechanical slider and the switch nub. An increased assembly tolerance improves yield for mechanical parts and reduces the cost of manufacturing.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and circuitry have been described at a relatively high-level, without detail, to avoid unnecessarily obscuring aspects of the present teachings.

The term "coupled" as used herein refers to any logical, optical, physical, or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

The orientations of the movable assembly, associated components, and any complete assemblies such as shown in any of the drawings, are given by way of example only, for illustration and discussion purposes. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any component as otherwise described herein.

Reference now is made in detail to the examples illustrated in the accompanying drawings and discussed below.

FIG. 1 depicts a slide switch assembly 100 disposed in an enclosure 180 with a mechanical slider 102 extending through an oblong opening 182 of the enclosure 180. The opening 182 is covered by a cosmetic trim 104. The switch assembly 100 is secured to the enclosure 180 by screws 186A-B. The slider 102 extends past a face 188 of the enclosure 180 so that it may be manipulated by a user.

FIG. 2 depicts an exploded view of the slide switch assembly 100. The slide switch assembly 100 includes the cosmetic trim 104, the slider 102, a bushing 120, a bracket 130, an elastomer web 140, a PCB switch 160, and a printed circuit board (PCB) 170. A first surface 110 of the cosmetic trim 104 has a rectangular shape and couples to an interior surface 183 of the enclosure 180. The cosmetic trim 104 has an opening 106 extending between the first surface 110 and a second surface 112 with a protruding rim 108 extending from the first surface 110 and through the opening 182. The opening 106 of the cosmetic trim 104 is obround and is configured to allow the slider 102 to pass through it. The opening 106 allows for the lateral movement of the slider 102.

The slider 102 includes a flange 113 with a front surface 116 and a cylindrical knob 114 extending from the front surface 116. The knob 114 has a chamfered edge to prevent sharp corners that may snag on objects in the environment of the slide switch assembly 100. The knob 114 allows the user to maneuver the slider 102. The front surface 116 of the flange 113 is rectangular in shape and is configured to slide past the second surface 112 of the cosmetic trim 104. The flange 113 has a rectangular back surface 118 with two rectangular protrusions 115A and 115B that form a fork. The protrusions 115A and 115B are configured to receive a nub 162 of the PCB switch 160.

The bushing 120 is rectangular in shape and is disposed between the slider 102 and the bracket 130. The bushing 120 has a first surface 124 that contacts the back surface 118 of the slider 102. The back surface 118 is configured to slide past the first surface 124 of the bushing 120. The bushing 120 has a rectangular opening 122 between the first surface 124 and a second surface 126. The opening 122 is configured to have the protrusions 115A-B pass through it and slide laterally within the opening 122. The second surface 126 is in contact with the bracket 130.

The bracket 130 has a rectangular shape and a recess 134 that is configured to house the bushing 120. The recess 134 also houses the flange 113 of the slider 102. The bracket 130 has a rectangular opening 132 configured to allow the protrusions 115A-B of the slider 102 to pass through the bracket 130 and slide laterally within the opening 132. The bracket 130 has threaded openings 138A and 138B configured to receive screws 186A and 186B to secure the bracket 130 to the interior surface 183 of the enclosure 180. The threaded openings 138A-B of the bracket 130 align with screw openings 184A-B of the enclosure 180.

The elastomer web 140 has a rectangular shape and includes a first surface 148 in contact with the bracket 130. The elastomer web may be made of silicone, natural rubber, synthetic rubber, or other elastic materials that can deform and retain its shape. The elastomer web 140 has a raised edge 144 configured to partially encompass the bracket 130. The elastomer web 140 has a rectangular opening 142 configured to allow the protrusions 115A-B to pass through the elastomer web 140 and slide laterally within the opening 142. The elastomer web 140 has screw openings 146A-B configured to receive the ends of the screws 186A-B and align with the threaded openings 138A-B of the bracket 130. Flex openings 150A-B extend through the elastomer web 140 on respective sides of the rectangular opening 142 and are disposed between the rectangular opening 142 and the screw openings 146A-B. The flex openings 150A-B are rectangular with the longest side in the vertical direction. The flex openings 150A-B make the elastomer web 140 more flexible, particularly in the area surrounding the rectangular opening 142.

The PCB switch 160 is coupled to the PCB 170 by a connector 164. The protruding nub 162 of the PCB switch 160 extends into the opening 142 of the elastomer web 140. The PCB switch 160 is bistable with the nub 162 in a first position (FIG. 3A) and a second position (FIG. 3B).

The obround opening 182 is configured to house the protrusion 108 of the cosmetic trim 104. The screw openings 184A and 184B of the enclosure 180 are configured to receive the screws 186A and 186B and align with the screw openings 138A-B and 146A-B of the bracket 130 and elastomer web 140, respectively.

FIG. 3A and FIG. 3B depict a cross sectional view of the assembled slide switch assembly 100. FIG. 3A depicts the slider 102 of the slide switch assembly 100 in a first position and FIG. 3B depicts the slider 102 in a second position. Toggling the position of the slide switch assembly 100 controls electronic devices coupled to the PCB 170. For example, the slide switch assembly 100 is used to power on and off an electronic device or to turn on and off a device's functionality such as Bluetooth®. As shown in FIG. 4, the interior surface 183 of the enclosure 180 has a first recess 192 receiving the cosmetic trim 104 and a larger second recess 190 receiving the bracket 130 and elastomer web 140. The recess 134 of the bracket 130 creates a laterally extending gap 136 between the bracket 130 and cosmetic trim 104 that houses the bushing 120 and provides space for the flange 113 of the slider 102 to slide laterally.

The longitudinal opening 142 of the elastomer web 140, the opening 132 of the bracket 130, and the opening 122 of the bushing 120 align with one another to allow the protrusions 115A-B to laterally pass through the switch assembly 100 and straddle the nub 162. The aligned openings allow a side to side movement of the protrusions 115A-B. A space S between protrusions 115A-B is slightly larger than the width of the nub 162 and creates a gap 166 between the protrusions 115A-B and the nub 162, as shown in FIG. 3B. The gap 166 provides mechanical tolerance during assembly.

The opening 142 of the elastomer web 140 is smaller in width than the opening 132 of the bracket 130. The width of the opening 142 is less than the width of the protrusions 115A-B and nub 162, which generates an interference fit with the slider 102. The interference fit compresses the elastomer web 140 to generate a small bias force that biases the elastomer web 140 against the protrusions 115A-B in each position. In the first position (FIG. 3A) an elastomer web portion 168A compresses against the protrusion 115A thus biasing the protrusion 115A against the nub 162. In the second position (FIG. 3B) an elastomer web portion 168B compresses against the protrusions 115B thus biasing the protrusion 115B against the nub 162. The bias force created by the elastomer web 140 on the slider 102 substantially eliminates loose rattling of the slider 102 within the switch assembly 100 that would otherwise exist due to the spacing 166 between the nub 162 and the protrusions 115A-B. In addition, the elastomer web 140 dampens any vibration of the slider 102. The bias force also substantially eliminates the perception of loose motion or backlash when the user actuates the switch assembly 100, increasing the perception of quality. The bias force also allows for a looser assembly tolerance between the protrusions 115A-B of the slider 102 and the nub 162. This improves the yield for mechanical parts and reduce the cost of manufacturing.

FIG. 5A depicts an electronic eyewear device 500 having a frame 502 and temples 504. The frame 502 includes at least one electronic component 506, such as a processor, and the temple 504 includes at least one second electronic component 508, such as a peripheral device operable with the processor. The frame 502 supports optical elements 510 that each include a display 512 configured to generate a viewable image, such as an augmented reality (AR) virtual image.

FIG. 5B depicts a side view of the electronic eyewear device 500 with the slide switch assembly 100 disposed in the temple 504. The temple 504 includes the enclosure 180. The electronic eyewear device 500 includes a camera 516 supported by the frame 502 that is electrically coupled to the electronic component 506. The slide switch assembly 100 is electrically coupled to the electronic component 506 by connector 514. The slide switch assembly 100 may be configured to control various functions of the electronic eyewear device 500. In one example, the slide switch assembly 100 may be used to power the electronic eyewear device 500 on and off. In another example, the slide switch assembly 100 is used to turn the camera 516 on and off.

FIG. 6 is a flow chart 600 of a method for operating the slide switch assembly 100.

At block 602, the slider 102 is in the first position and the elastomer web 140 is biased against the protrusions 115A-B at portion 168A. The bias force of the elastomer web 140 reduces or eliminates free movement of the slider 102 about the nub 162 of the PCB switch 160.

At block 604, a user moves the slider 102 from the first position shown in FIG. 3A to the second position shown in FIG. 3B, thereby moving the nub 162 from the first position to the second position. The change in position of the nub 162 of the PCB switch 160 controls electronics coupled to the PCB 170.

At block 606, the slider 102 is in the second position and the elastomer web 140 is biased against the protrusions 115A-B at portion 168B. The bias force of the elastomer web 140 eliminates free movement of the slider 102 about the nub 162 of the PCB switch 160.

FIG. 7 is a flow chart 700 of a method for manufacturing the slide switch assembly 100.

At block 702, the cosmetic trim 104 is secured to and disposed within the oblong opening 182 of the enclosure 180. The first surface 110 of the cosmetic trim 104 contacts the interior surface 183 of the enclosure 180.

At block 704, the knob 114 of the mechanical slider 102 is disposed within the cosmetic trim 104 so that the knob 114 extends through the oblong opening 182 of the enclosure 180. The front surface 116 of the flange 113 of the slider 102 contacts the second surface 112 of the cosmetic trim 104.

At block 706, the bushing 120 is disposed over the protrusions 115A-B of the slider 102 with the protrusions 115A-B extending through the opening 122 of the bushing 120. The first surface 124 of the bushing 120 contacts the back surface 118 of the slider 102.

At block 708, the bracket 130 is disposed over the protrusions 115A-B of the slider 102 with the protrusions 115A-B extending through the opening 132 of the bracket 130. The recess 134 houses the bushing 120 and the flange 113 of the slider 102.

At block 710, the elastomer web 140 is secured to the bracket 130. The first surface 148 of the elastomer web 140 contacts the bracket 130 and the raised edge 144 partially encompasses the bracket 130. The raised edge 144 of the elastomer web 140 is stretched around the bracket 130 so that elastic forces of the elastomer web 140 secure it to the bracket 130.

At block 712, the screws 186A-B are screwed through the enclosure 180, bracket 130, and elastomer web 140 to secure the bracket 130 and the elastomer web 140 to the enclosure 180.

At block 714, the PCB switch 160 is secured to the enclosure 180 with the nub 162 disposed between the protrusions 115A-B of the mechanical slider 102.

The switch assembly 100 may have other configurations or shapes that provide the same functionality. Other embodiments may alter the shape and design of the switch assembly 100 for specific space constraints or to fit the shape of the enclosure 180. For example, the knob 114 of the slider 102 may have a variety of shapes such as round, rectangular, or oblong. The flange 113 of the slider 102, the bushing 120, the bracket 130, and the elastomer web 140 may have a slight curvature to fit a curved interior surface 183 of the enclosure 180.

Other switch designs may also employ the elastomer web 140 mechanism of applying a bias force to a moveable piece of a switch such as the mechanical slider 102. For example, the elastomer web 140 may be utilized in a standard light switch to remove the free movement of the switch. The switch assembly 100 may be used in a variety of electronic devices such as speakers, computers, laptops, TV's, monitors, lamps, power banks, drones, remote controlled vehicles, or other similar devices.

What is claimed is:

1. A slide switch assembly, comprising:
an enclosure comprising an opening;
a switch disposed in the enclosure and including a nub, wherein the nub is movable between a first position and a second position;
a mechanical slider disposed in the enclosure and configured to engage the nub, wherein the mechanical slider is configured to move the nub between the positions, wherein the mechanical slider comprises a first protrusion and a second protrusion with the nub disposed between the first protrusion and the second protrusion, wherein there is a first gap between the nub and the first protrusion when the switch is in the first position and no gap between the nub and the second protrusion, and there is a second gap between the nub and the second protrusion when the switch is in the second position; and
an elastomer web disposed between the enclosure and the switch, wherein the elastomer web provides a bias force configured to restrict rattling of the mechanical slider, wherein the elastomer web has a longitudinal first oper e disposed in the first opening.

2. The slide switch assembly of claim 1, wherein the elastomer web is configured to compress against the mechanical slider.

3. The slide switch assembly of claim 2, wherein the elastomer web is configured to restrict lateral movement of the mechanical slider.

4. The slide switch assembly of claim 3, wherein the elastomer web is configured to compress against the mechanical slider as the nub moves between the first position and the second position.

5. The slide switch assembly of claim 3, wherein the elastomer web comprises a second opening and a third opening with the first opening disposed between the second and third openings, wherein the second and the third openings make the elastomer web more flexible.

6. The slide switch assembly of claim 1, wherein the protrusions of the mechanical slider pass through the first opening.

7. The slide switch assembly of claim 1, wherein the mechanical slider comprises a flange, wherein the first and the second protrusions of the mechanical slider protrude from the flange.

8. The slide switch assembly of claim 1, further comprising a space longitudinally disposed between the first protrusion of the mechanical slider and the nub.

9. The slide switch assembly of claim 8 further comprising an electronic eyewear device, wherein the switch is coupled to the electronic eyewear device.

10. An electronic eyewear device, comprising;
a frame;
an optical member supported by the frame;
a temple coupled to the frame;
a switch assembly coupled to the temple and comprising a switch including a nub, wherein the nub is movable between a first position and a second position, a mechanical slider disposed in the temple and configured to engage the nub, wherein the mechanical slider is configured to move the nub between the positions, wherein the mechanical slider comprises a first protrusion and a second protrusion with the nub disposed between the first protrusion and the second protrusion, wherein there is a first gap between the nub and the first protrusion when the mechanical slider is in the first position and no gap between the nub and the second protrusion, and there is a second gap between the nub and the second protrusion when the mechanical slider is in the second position; and an elastomer web disposed between the temple and the switch, wherein the elastomer web provides a bias force configured to restrict rattling of the mechanical slider, wherein the elastomer web has a longitudinal first opening, wherein the gaps are disposed in the first opening.

11. The electronic eyewear device of claim 10, wherein the elastomer web is configured to compress against the mechanical slider.

12. The electronic eyewear device of claim 11, wherein the elastomer web is configured to restrict lateral movement of the mechanical slider.

13. The electronic eyewear device of claim 12, wherein the elastomer web is configured to compress against the mechanical slider as the nub moves between the first position and the second position.

14. The electronic eyewear device of claim 12, wherein the elastomer web comprises a second opening and a third opening with the first opening disposed between the second and third openings, wherein the second and the third openings make the elastomer web more flexible.

15. The electronic eyewear device of claim 12, wherein the protrusions of the mechanical slider pass through the elastomer web first opening.

16. The electronic eyewear device of claim 10, wherein the mechanical slider comprises a flange, wherein the first and the second protrusions of the mechanical slider protrude from the flange.

17. The electronic eyewear device of claim 10, further comprising a space longitudinally disposed between the first protrusion of the mechanical slider and the nub.

18. A method of manufacturing a slide switch assembly comprising an enclosure including an opening, a switch disposed in the enclosure and including a nub, wherein the nub is movable between a first position and a second position, a mechanical slider disposed in the enclosure including a first and a second protrusion configured to engage the nub, wherein the mechanical slider is configured to move the nub between the positions, wherein the mechanical slider comprises a first protrusion and a second protrusion with the nub disposed between the first protrusion and the second protrusion, wherein there is a first gap between the nub and the first protrusionene-of when the mechanical slider is in the first position and no gap between the nub and the second protrusion, and there is a second gap between the nub and the second protrusion when the mechanical slider is in the second position, and an elastomer web disposed between the enclosure and the switch, wherein the elastomer web provides a bias force configured to restrict rattling of the mechanical slider, wherein the elastomer web has a longitudinal first opening wherein the gaps are disposed in the first opening, comprising the step of:

positioning the mechanical slider between the first and second positions.

* * * * *